(12) United States Patent
Lv et al.

(10) Patent No.: US 12,744,206 B2
(45) Date of Patent: Sep. 22, 2026

(54) NEGATIVE ELECTRODE ACTIVE MATERIAL AND PREPARATION METHOD THEREOF, SECONDARY BATTERY, BATTERY MODULE, BATTERY PACK, AND ELECTRICAL APPARATUS

(71) Applicant: CONTEMPORARY AMPEREX TECHNOLOGY (HONG KONG) LIMITED, Hong Kong (CN)

(72) Inventors: Zijian Lv, Ningde City (CN); Jiazheng Wang, Ningde City (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 616 days.

(21) Appl. No.: 18/316,207

(22) Filed: May 11, 2023

(65) Prior Publication Data

US 2023/0282814 A1 Sep. 7, 2023

Related U.S. Application Data

(63) Continuation of application No. PCT/CN2021/137188, filed on Dec. 10, 2021.

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/133* (2013.01); *H01M 4/134* (2013.01); *H01M 4/386* (2013.01);
(Continued)

(58) Field of Classification Search
CPC ...... H01M 4/366; H01M 4/133; H01M 4/134; H01M 4/386; H01M 4/587;
(Continued)

(56) References Cited

U.S. PATENT DOCUMENTS

2021/0288316 A1* 9/2021 Sha ...................... H01M 4/366
2021/0384492 A1* 12/2021 Kwon .............. H01M 10/0525
2022/0149358 A1* 5/2022 Moon .................. H01M 4/366

FOREIGN PATENT DOCUMENTS

CN 106299318 A 1/2017
CN 108461723 A 8/2018
(Continued)

OTHER PUBLICATIONS

The extended European search report received in the corresponding European Application 21954419.4, mailed on Aug. 22, 2024.
(Continued)

*Primary Examiner* — Christian Roldan
(74) *Attorney, Agent, or Firm* — K&L Gates LLP

(57) ABSTRACT

A negative electrode active material and a preparation method, a secondary battery, a battery module, a battery pack and an electrical apparatus are provided. The negative electrode active material comprises an inner core, an interlayer and an outer shell layer, wherein the interlayer is cladded on the surface of the inner core, and the outer shell layer is cladded on the surface of the interlayer; the inner core comprises silicon, an oxide of silicon and lithium silicate; the interlayer comprises silicon, or silicon and lithium silicate; and the outer shell layer comprises amorphous carbon. An inner core comprising silicon, an oxide of silicon and lithium silicate is used as a nucleus, and an interlayer containing silicon as well as an outer shell layer comprising amorphous carbon are cladded outwards in sequence to form a uniformly cladded and structurally stable
(Continued)

negative electrode active material with a core-shell structure.

7 Claims, 10 Drawing Sheets

(51) Int. Cl.

| | |
|---|---|
| ***H01M 4/04*** | (2006.01) |
| ***H01M 4/133*** | (2010.01) |
| ***H01M 4/134*** | (2010.01) |
| ***H01M 4/38*** | (2006.01) |
| ***H01M 4/587*** | (2010.01) |
| ***H01M 4/62*** | (2006.01) |

(52) U.S. Cl.
CPC ...... *H01M 4/587* (2013.01); *H01M 2004/021* (2013.01); *H01M 2004/027* (2013.01)

(58) Field of Classification Search
CPC ..... H01M 2004/021; H01M 2004/027; H01M 4/131; H01M 4/0428; H01M 4/1391; H01M 4/1395; H01M 4/364; H01M 4/38; H01M 4/485; H01M 4/5825; H01M 4/625; H01M 10/0525; H01M 4/13; H01M 4/483; Y02E 60/10
See application file for complete search history.

(56) References Cited

FOREIGN PATENT DOCUMENTS

| | | | | | |
|---|---|---|---|---|---|
| CN | 109755500 | A | | 5/2019 | |
| CN | 110364700 | A | | 10/2019 | |
| CN | 110649236 | A | | 1/2020 | |
| CN | 108461723 | B | * | 8/2020 | ........ H01M 10/0525 |
| CN | 111554909 | A | | 8/2020 | |
| CN | 112186188 | A | | 1/2021 | |
| CN | 112234174 | A | | 1/2021 | |
| CN | 112289999 | A | | 1/2021 | |
| CN | 112467108 | A | | 3/2021 | |
| CN | 112701267 | A | | 4/2021 | |
| CN | 112968152 | A | | 6/2021 | |
| CN | 113363437 | A | | 9/2021 | |
| CN | 113764642 | A | | 12/2021 | |
| EP | 3879605 | A1 | | 9/2021 | |
| WO | 2016121323 | A1 | | 8/2016 | |
| WO | 2019107033 | A1 | | 6/2019 | |

OTHER PUBLICATIONS

Notice of Reasons for Refusal received in the corresponding Japanese Application 2023-513745, mailed on Aug. 13, 2024.

Office Action issued to related KR Patent Application No. 10-2023-7006323, dated Mar. 28, 2025, 27 pages (with English translation).

International Search Report received in the corresponding International Application PCT/CN2021/137188, mailed Jul. 27, 2022.

Notice of Reasons for Refusal received in the corresponding Japanese Application 2023-513745, mailed Mar. 11, 2024.

Notice of Allowance (with English Machine Translation), mailed Jun. 22, 2026, for corresponding Chinese Patent Application Serial No. 202180094457.1.

* cited by examiner

NEGATIVE ELECTRODE ACTIVE MATERIAL AND PREPARATION METHOD THEREOF, SECONDARY BATTERY, BATTERY MODULE, BATTERY PACK, AND ELECTRICAL APPARATUS

CROSS-REFERENCE TO RELATED APPLICATIONS

The present application is a continuation of International Application PCT/CN2021/137188, filed Dec. 10, 2021 and entitled "NEGATIVE ELECTRODE ACTIVE MATERIAL AND PREPARATION METHOD THEREOF, SECONDARY BATTERY, BATTERY MODULE, BATTERY PACK, AND ELECTRICAL APPARATUS", which is incorporated herein by reference in its entirety.

TECHNICAL FIELD

The present application relates to the technical field of secondary batteries, and in particular to a negative electrode active material and a preparation method, a battery, a battery module, a battery pack and an electrical apparatus.

BACKGROUND ART

With the rapid development of the new energy fields, secondary batteries are widely applied in various large power plants, energy storage systems and various consumer products due to their advantages of excellent charge/discharge chemical performance, memoryless effect, less environmental pollution, etc. In recent years, with the wide popularization of electrical apparatuses such as smart phones and electric vehicles, lithium-ion secondary batteries have been widely used.

However, with the increasing customer demands, some electrochemical properties of lithium-ion secondary batteries, especially the energy density of batteries, still need to be improved, which puts forward higher requirements for the development of lithium-ion secondary batteries.

SUMMARY OF THE INVENTION

The present application has been made in view of the above-mentioned topics, and an object thereof is to provide a negative electrode active material and a preparation method thereof, a battery, a battery module, a battery pack, and an electrical apparatus, so that a secondary battery has both good first coulombic efficiency and first reversible specific capacity, and thus the energy density of the secondary battery is improved.

A first aspect of the present application provides a negative electrode active material comprising: an inner core comprising silicon, an oxide of silicon, and lithium silicate; an interlayer comprising silicon, or comprising silicon and lithium silicate; and an outer shell layer comprising amorphous carbon; wherein the interlayer is cladded on the surface of the inner core, and the outer shell layer is cladded on the surface of the interlayer.

In any of embodiments, based on the total mass of the negative electrode active material, the mass content of silicon element is 50%-70%.

In any of embodiments, based on the total mass of the negative electrode active material, the mass content of lithium element is 3%-10%; optionally, the mass content of carbon element is 2%-10%.

In any of embodiments, the negative electrode active material has a volume average particle size Dv50 of 3.5 μm-10 μm, the thickness of the interlayer thereof is 100 nm-400 nm, and the thickness of the outer shell layer thereof is 20 nm-150 nm.

In any of embodiments, the phase interface between the inner core of the negative electrode active material and the interlayer thereof has a recessed structure.

In any of embodiments, as an important component of the inner core of the negative electrode active material, the oxide of silicon is SiOx, wherein $0.9<x<1.2$.

A second aspect of the present application provides a method for preparing a negative electrode active material, comprising the steps of:

- selecting an inner core precursor;
- subjecting the inner core precursor to an alkaline solution etching treatment, so that a recessed structure is formed on the surface of the inner core precursor;
- placing inner core in a vapor deposition system, and introducing a first mixed gas to carry out a first reaction, so that the surface of the inner core is cladded with an interlayer to form a first intermediate;
- placing the first intermediate in a vapor deposition system, and introducing a second mixed gas to carry out a second reaction, so that an outer shell layer is formed on the interlayer to form a second intermediate;
- subjecting the second intermediate to a solid pre-lithiation reaction with a pre-lithiation agent to form a pre-lithiated body;
- washing the pre-lithiated body in a solvent, filtering, oven drying and sieving to form the negative electrode active material; wherein the formed negative electrode active material comprises:
- the inner core comprising silicon, an oxide of silicon, and/or lithium silicate;
- the interlayer comprising silicon, or comprising silicon and lithium silicate;
- the outer shell layer comprising amorphous carbon;
- wherein the interlayer is cladded on the surface of the inner core, and the outer shell layer is cladded on the surface of the interlayer.

In any of embodiments, in the method for preparing the negative electrode active material of the present application, the volume average particle size Dv50 of the particles of the inner core precursor is 3-7 μm, and $1 \leq (Dv90-Dv10)/Dv50 \leq 1.4$.

In any of embodiments, in the method for preparing the negative electrode active material of the present application, the solid-liquid mass ratio of the inner core precursor to the alkaline solution is 0.5-1.5:2.5-3.5.

In any of embodiments, in the method for preparing the negative electrode active material of the present application, the concentration of the alkaline solution is 0.5 mol/L-3 mol/L, and the time of alkaline solution etching treatment is 10 min-120 min.

In any of embodiments, in the method for preparing the negative electrode active material of the present application, the temperature of the first reaction is 500° C.-800° C.; the first mixed gas comprises a first reaction gas and a first carrier gas, wherein the mass percentage of the first reaction gas is 5%-50%, and the mass percentage of the first carrier gas is 50%-95%.

In any of embodiments, in the method for preparing the negative electrode active material of the present application, the temperature of the second reaction is 500° C.-800° C.; the second mixed gas comprises a second reaction gas and a second carrier gas, wherein the mass percentage of the second reaction gas is 5%-50%, and the mass percentage of the second carrier gas is 50%-95%.

In any of embodiments, in the method for preparing the negative electrode active material of the present application, the first reaction gas is one or more of silane, silicon halide and other silane derivatives, and the first carrier gas is one or more of argon, nitrogen and helium.

In any of embodiments, in the method for preparing the negative electrode active material of the present application, the second reaction gas is one or more of methane, ethane, ethylene and acetylene, and the second carrier gas is one or more of argon, nitrogen and helium.

In any of embodiments, in the method for preparing the negative electrode active material of the present application, the pre-lithiation agent is added in an amount of 5%-20% of the total mass of the second intermediate and the pre-lithiation agent; the reaction temperature of the solid pre-lithiation reaction is 500° C.-900° C., and the reaction time is 0.5-4 h.

In any of embodiments, in the method for preparing the negative electrode active material of the present application, the pre-lithiation agent is one or more of lithium metal, an oxygen-containing lithium salt and a non-oxygen-containing lithium salt, and optionally lithium metal, lithium amide, lithium titanate, lithium oxide and lithium acetate.

In any of embodiments, in the method for preparing the negative electrode active material of the present application, in the washing step, the mass ratio of the pre-lithiated body to the solvent is 0.25-0.6:1, the solvent is water or ethanol, and the washing time is 5 min-120 min.

A third aspect of the present application provides a secondary battery comprising the negative electrode active material of the first aspect of the present application or the negative electrode active material prepared by the preparation method of the second aspect of the present application.

A fourth aspect of the present application provides a battery module comprising the secondary battery of the third aspect of the present application.

A fifth aspect of the present application provides a battery pack comprising the battery module of the fourth aspect of the present application.

A sixth aspect of the present application provides an electrical apparatus comprising at least one selected from the secondary battery of the third aspect of the present application, the battery module of the fourth aspect of the present application, and the battery pack of the fifth aspect of the present application.

With the above-mentioned technical solutions, the present application has the following beneficial effects:

In the present application, an inner core comprising silicon, an oxide of silicon and lithium silicate is used as a nucleus, and an interlayer containing silicon (and possibly also lithium silicate) as well as an outer shell layer comprising amorphous carbon are cladded outwards in sequence to form a uniformly cladded and structurally stable negative electrode active material with a core-shell structure, so that not only the content of silicon element in the negative electrode active material can be significantly increased, but also the side reactions between the silicon components and the active lithium in the electrolyte solution can be effectively suppressed, thereby simultaneously increasing the first reversible specific capacity and the first charge efficiency of the secondary battery.

The battery module, battery pack, and electrical apparatus of the present application comprise the secondary battery provided by the present application, and thus have at least the same advantages as those of the secondary battery.

DESCRIPTION OF DRAWINGS

The accompanying drawings are used to provide a further understanding of the present application and form part of this specification, and together with the embodiments of the present application are used to explain the present application without constituting a limitation on the present application.

In the drawings, like reference numerals are used for like parts, and the drawings are schematic and not necessarily drawn to actual scale.

In order to illustrate the embodiments of the present application or the technical solutions in the prior art more clearly, a simple description will be given below to the drawings to be used in the description of the embodiments or the prior art; and obviously, the drawings in the following description are only for one or several embodiments of the present application, and those of ordinary skill in the art may also obtain other drawings according to such drawings without involving any creative efforts.

Figure 1:
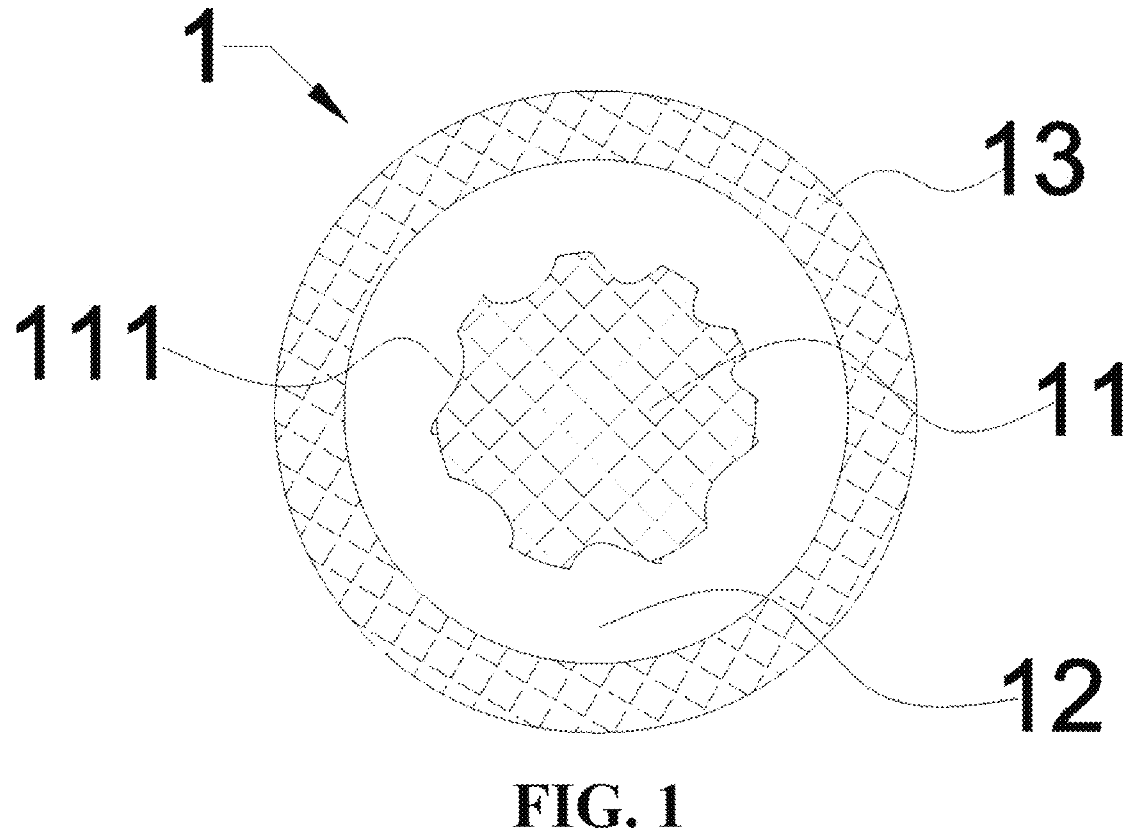
Figure 2:
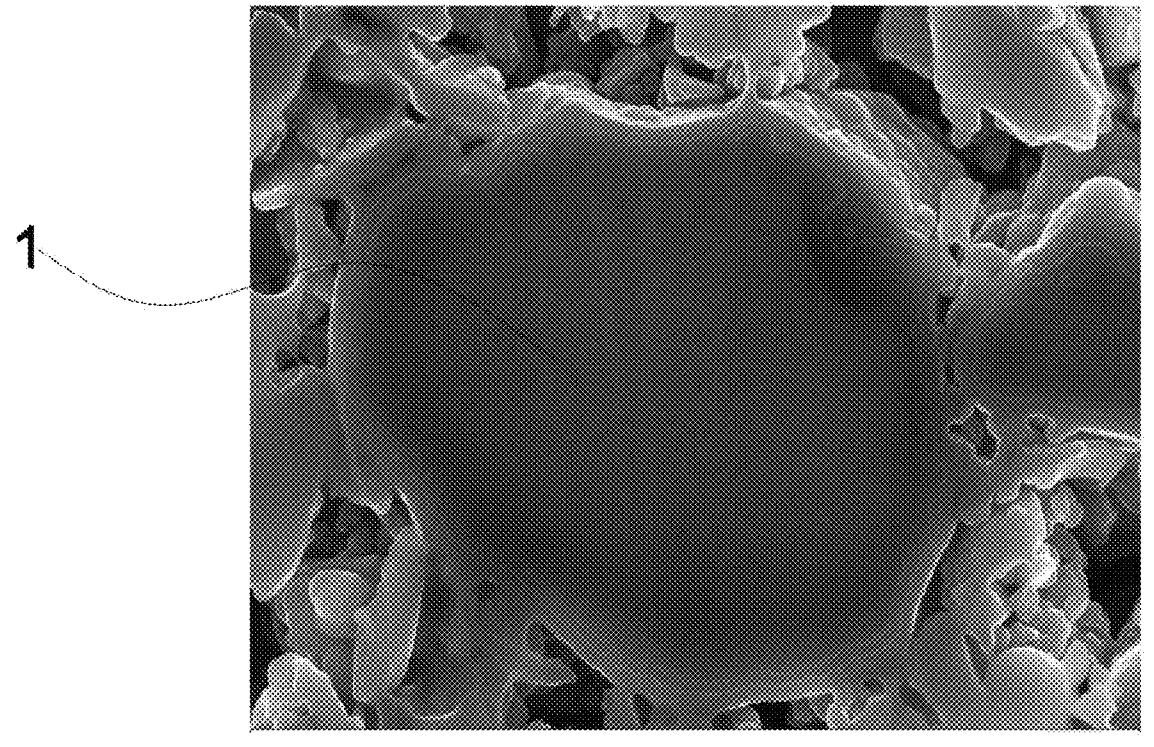
Figure 3:
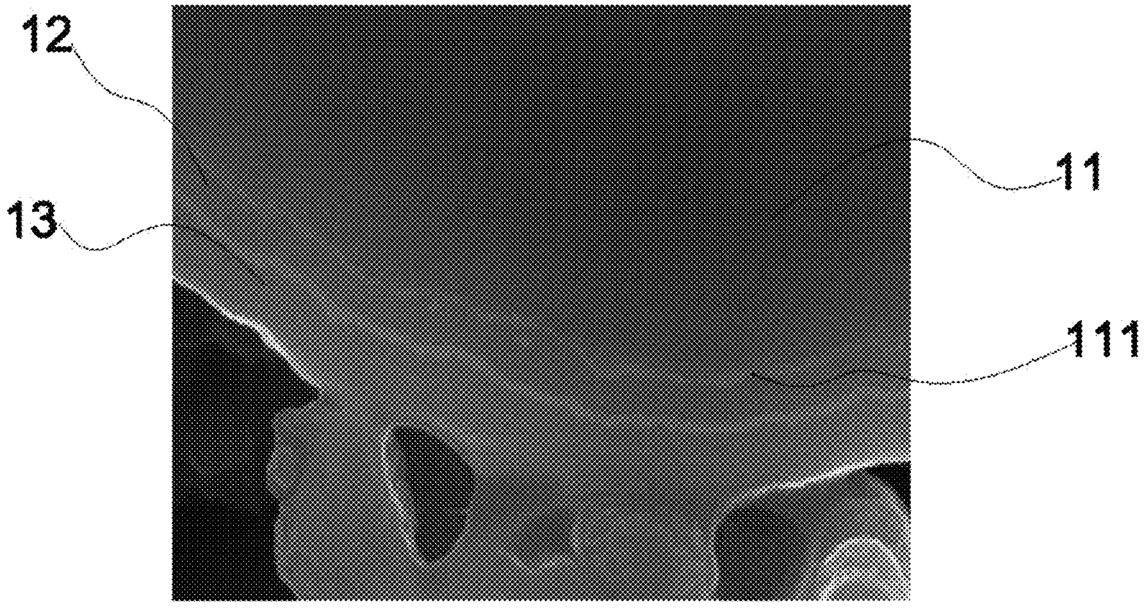
Figure 4:
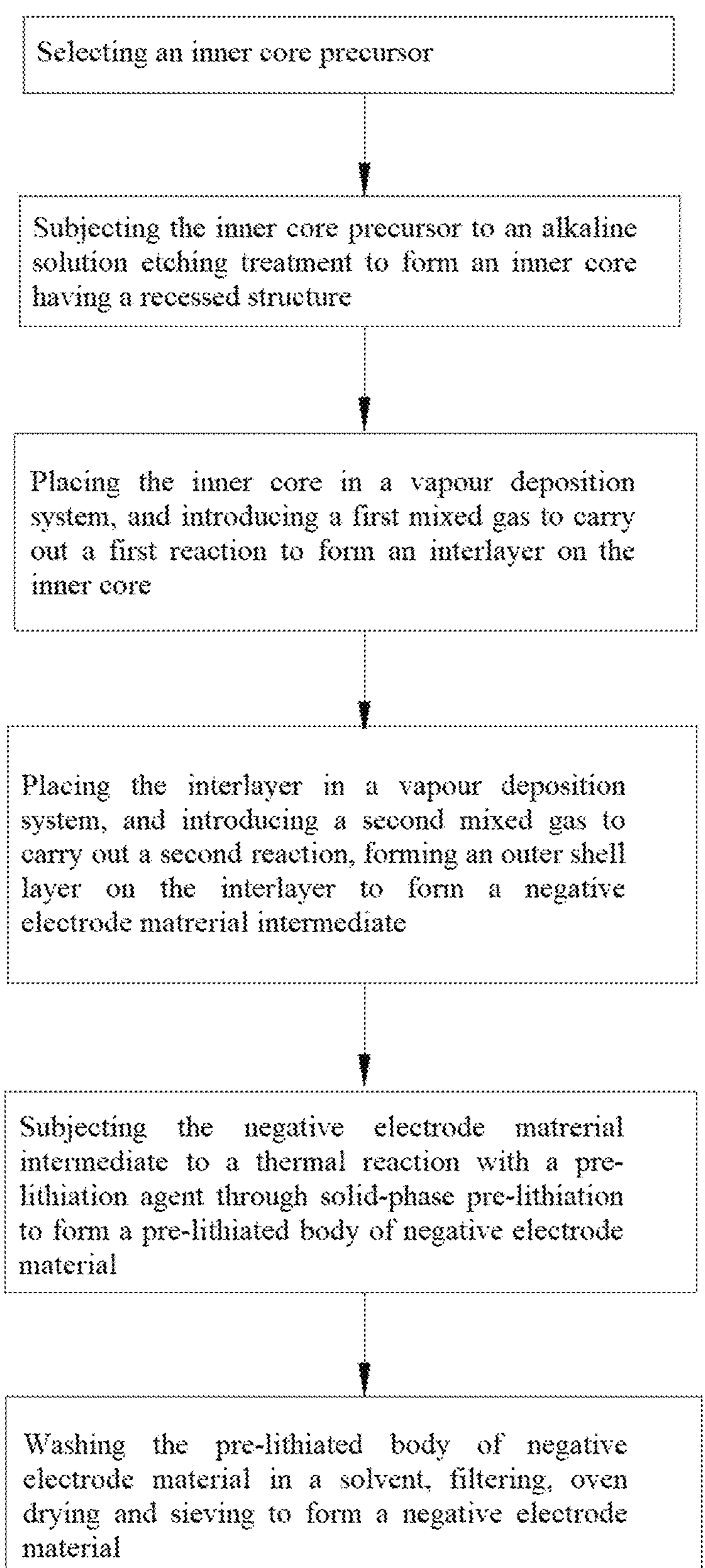
Figure 5:
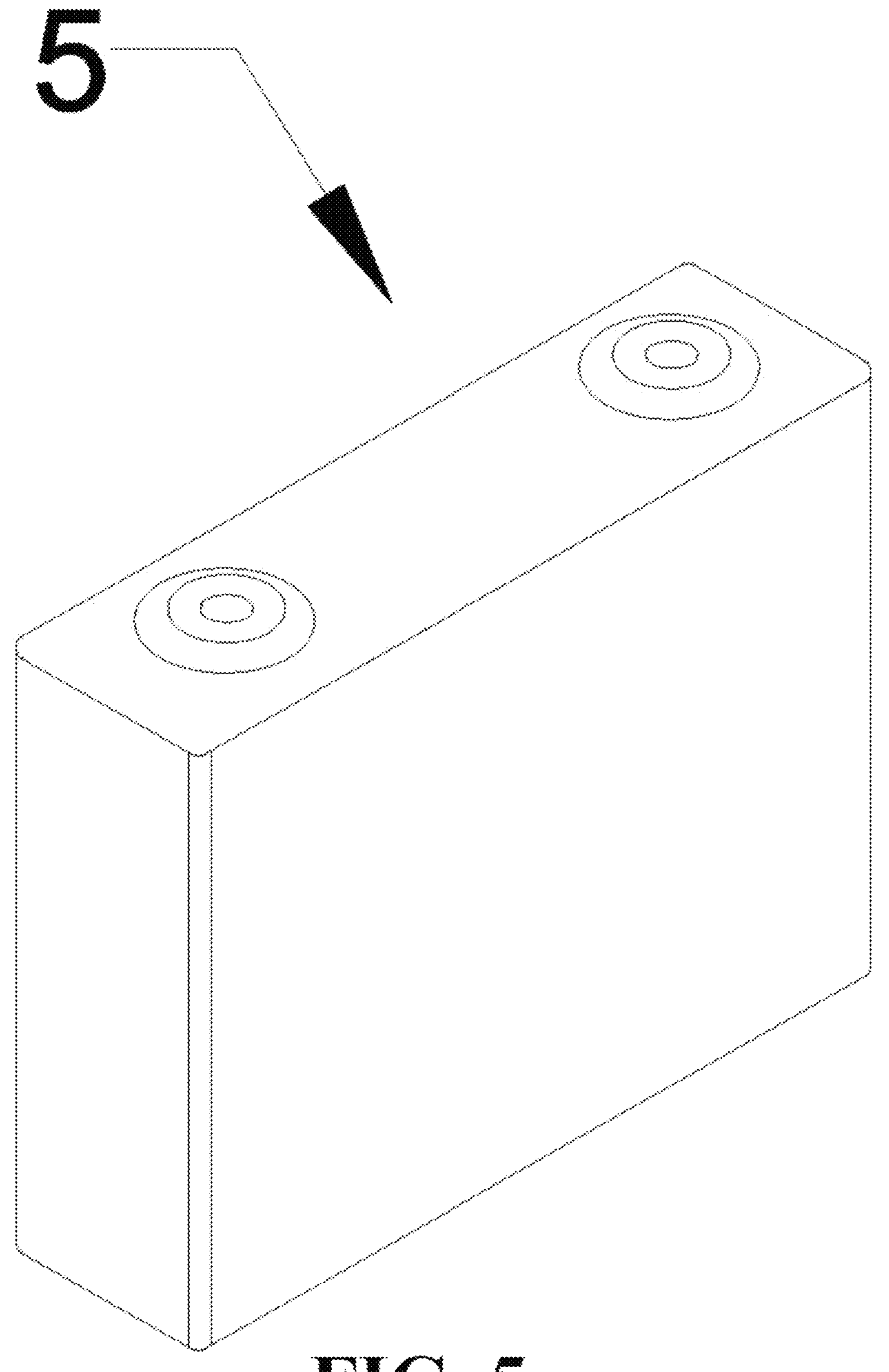
Figure 6:
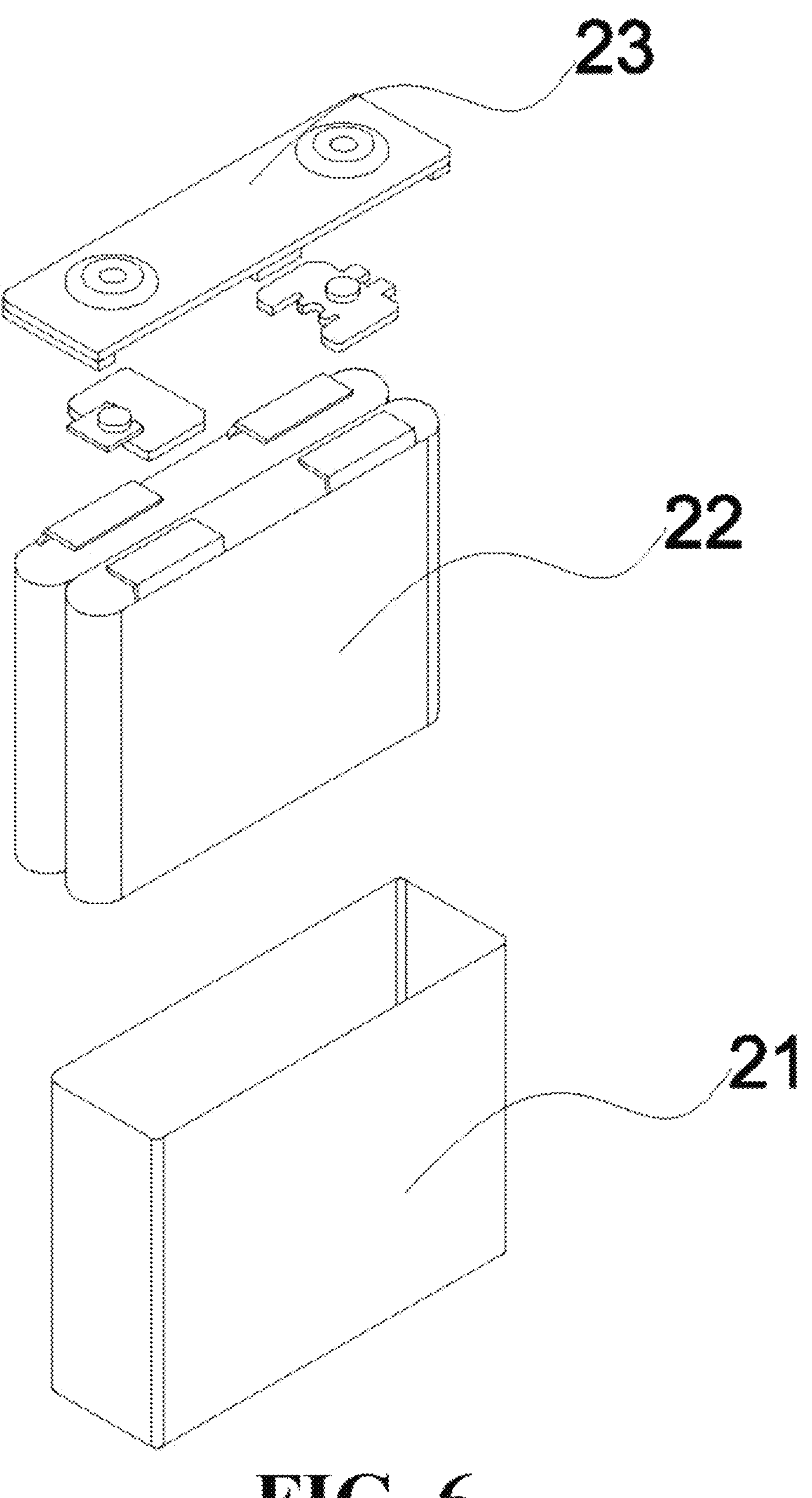
Figure 7:
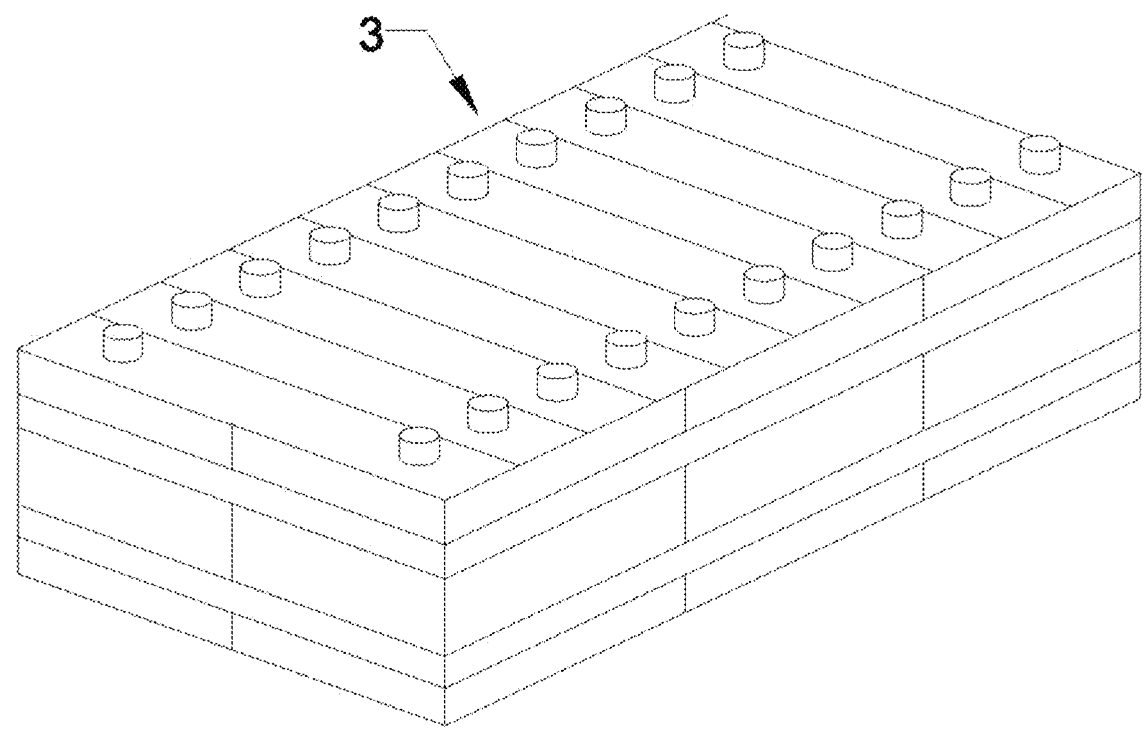
Figure 8:
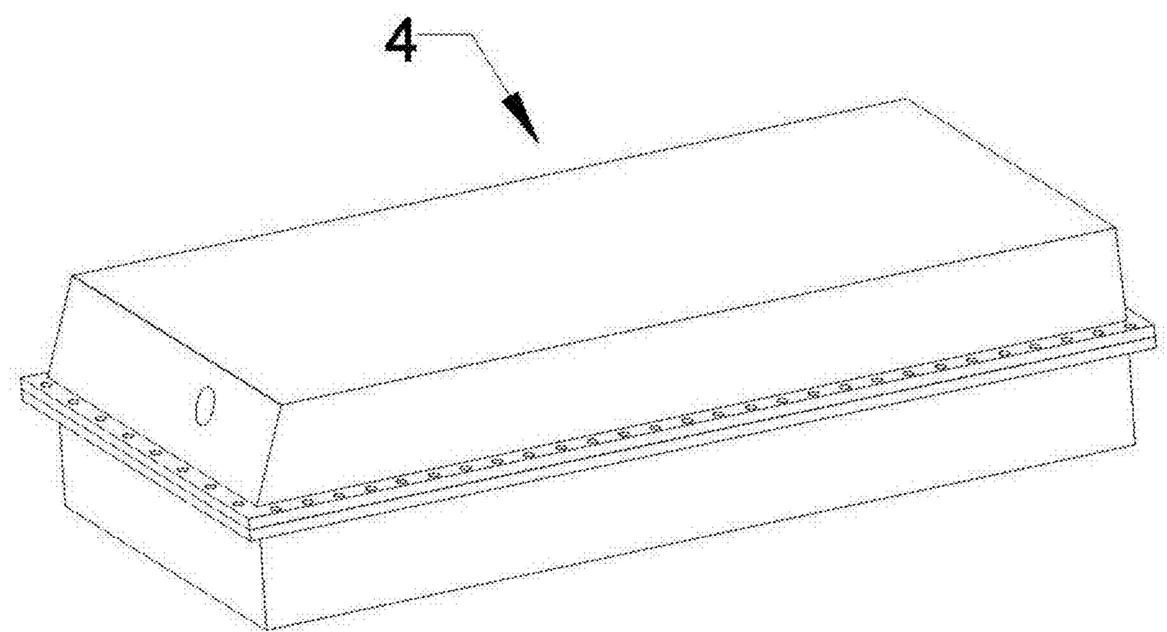
Figure 9:
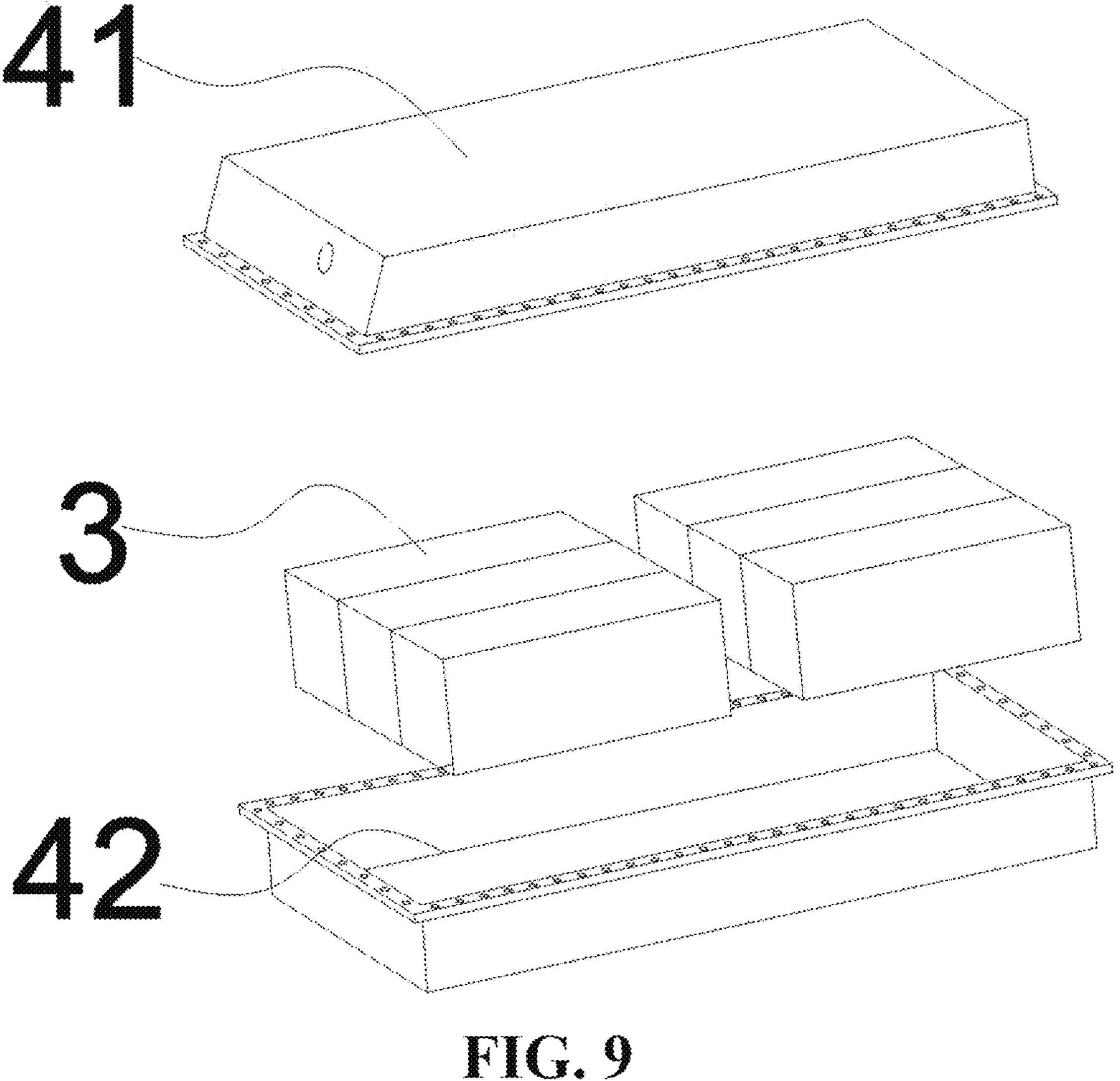
Figure 10:
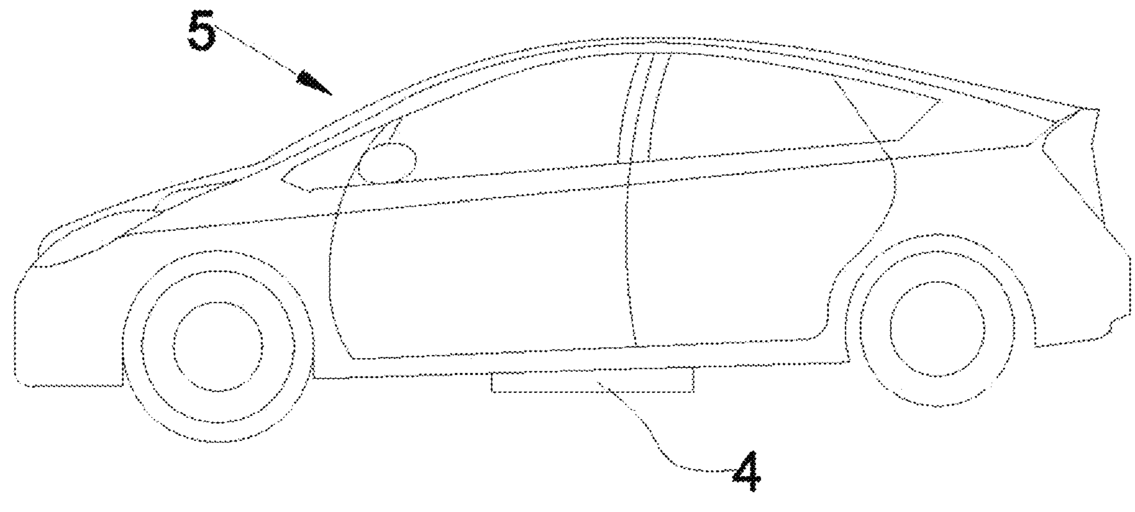

FIG. 1 is a schematic structural view of a negative electrode active material according to some embodiments of the present application;

FIG. 2 is an electron microscope scanning image of a negative electrode active material according to some embodiments of the present application;

FIG. 3 is an electron microscope scanning image of a negative electrode active material according to some embodiments of the present application;

FIG. 4 is a flow chart for preparing a negative electrode active material according to some embodiments of the present application;

FIG. 5 is a schematic structural view of a secondary battery according to some embodiments of the present application;

FIG. 6 is an exploded structural view of a secondary battery according to some embodiments of the present application;

FIG. 7 is a schematic structural view of a battery module according to some embodiments of the present application;

FIG. 8 is a schematic structural view of a battery pack according to some embodiments of the present application;

FIG. 9 is an exploded structural view of a battery pack according to some embodiments of the present application; and FIG. 10 is a schematic structural view of an electrical apparatus according to some embodiments of the present application.

DESCRIPTION OF MAIN REFERENCE NUMERALS

1 Negative electrode active material;
11 Inner core; 111 Recessed structure;
12 Interlayer;
13 Outer shell layer;
2 Secondary battery;
21 Case; 22 Electrode assembly; 23 Top cover assembly;
3 Battery module;
4 Battery pack;
41 Upper box; 42 Lower box;
5 Electrical apparatus.

DETAILED DESCRIPTION

Hereinafter, embodiments that specifically disclose the negative electrode active material and the preparation method thereof, the negative electrode sheet, the secondary battery, the battery module, the battery pack and the electrical apparatus of the present application will be described in detail with reference to the drawings as appropriate. However, there may be cases where unnecessary detailed description is omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

A "range" disclosed in the present application is defined in terms of a lower limit and an upper limit, and a given range is defined by selecting a lower limit and an upper limit, which define the boundaries of the particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. In addition, if the minimum range values 1 and 2 are listed, and if the maximum range values 3, 4, and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

In the description of the embodiments of the present application, the technical terms "first", "second", and the like are used only to distinguish between different objects, and are not to be understood as indicating or implying a relative importance or implicitly specifying a number, a particular order, or a primary or secondary relationship of the technical features indicated. In the description of the embodiments of the present application, the meaning of "a plurality of" is two or more, unless otherwise explicitly and specifically defined.

In the description of the embodiments of the present application, the term "and/or" is only an association relationship for describing associated objects, indicating that there may be three relationships, for example A and/or B may represent three situations: A exists alone, both A and B exist, and B exists alone. In addition, the character "/" herein generally indicates an "or" relationship between the associated objects before and after it. Unless otherwise specified, the terms "include/including" and "comprise/comprising" mentioned in the present application may be open-ended or closed-ended. For example, the "including" and "comprising" may indicate that it is also possible to include or comprise other components not listed, and it is also possible to include or comprise only the listed components.

Unless otherwise specified, the term "or" is inclusive in the present application. By way of example, the phrase "A or B" means "A, B, or both A and B". More specifically, the condition "A or B" is satisfied by any one of the following conditions: A is true (or present) and B is false (or absent); A is false (or absent) and B is true (or present); or both A and B are true (or present).

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientational or positional relationships indicated by the technical terms "center", "longitudinal", "transverse", "length", "width", "upper", "lower", "front", "back", "left", "right", "vertical", "horizontal", "top", "bottom", "inner", "upper", "clockwise", "counterclockwise", "axial", "radial", "circumferential" and the like are based on the orientational or positional relationships shown in the drawings, and are only for convenience and simplification of the description of the embodiments of the present application, and do not indicate or imply that the apparatuses or elements referred to must have particular orientations, be constructed and operated in particular orientations, and thus cannot be construed as limiting the embodiments of the present application.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, the method comprises steps (a) and (b), meaning that the method may comprise steps (a) and (b) performed sequentially, or may comprise steps (b) and (a) performed sequentially. For example, the reference to the method may further comprise step (c), meaning that step (c) may be added to the method in any order, for example, the method may comprise steps (a), (b) and (c), or may comprise steps (a), (c) and (b), or may comprise steps (c), (a) and (b), and so on.

The inventors of the present application have noticed that the graphite-based negative electrode active material of the prior art has limited improvement of the energy density of the secondary battery due to the limited gram capacity of the material itself, and based on this, the gram capacity of the negative electrode active material can be improved by mixing silicon material in graphite; however, the negative electrode active material prepared by mixing silicon material with graphite in the prior art has the problems of low first coulombic efficiency and low first reversible specific capacity, thus resulting in that the gram capacity of the negative electrode active material cannot be fully utilized, which will seriously suppress the utilization of the gram capacity of the positive electrode active material, so that the energy density of the secondary battery still cannot be significantly improved.

Through extensive experimental research, the inventors of the present application have developed a novel negative electrode active material with a unique double cladding layer structure, an inner core containing lithium silicate, and a significantly increased silicon element content, which can significantly improve the gram capacity utilization, the first coulombic efficiency and the first reversible specific capacity of the negative electrode active material, thereby improving the energy density of the battery.

[Negative Electrode Sheet]

Referring to the negative electrode active materials shown in FIG. 1-FIG. 3, the present application provides a negative electrode active material 1, comprising an inner core 11, an interlayer 12 and an outer shell layer 13, wherein the interlayer 12 is cladded on the surface of the inner core 11, and the outer shell layer 13 is cladded on the surface of the interlayer 12; the inner core 11 comprises silicon, an oxide of silicon and lithium silicate; the interlayer 12 comprises silicon and/or lithium silicate; and the outer shell layer 13 comprises amorphous carbon.

Referring to FIG. 1-FIG. 3, the inner core 11 is a nucleus located in the negative electrode active material 1, comprises silicon, an oxide of silicon and lithium silicate components, and is the part with the highest content ratio of the entire negative electrode active material, and thus is also the key part of the negative electrode active material for contributing to the capacity and improving the first efficiency, wherein the components silicon and oxide of silicon are the main components contributing to the capacity, and the lithium silicate component in the inner core can effectively suppress the reaction between the silicon component in the negative electrode active material and the active lithium in the electrolyte solution, thereby preventing the capacity loss and the decrease of the first coulombic efficiency of the secondary battery.

Referring to FIG. 1-FIG. 3, the interlayer 12 is cladded on the outer surface of the inner core 11, and comprises silicon, lithium silicate or a composite of silicon and lithium silicate, and various components of the interlayer are uniformly cladded on the outer surface of the inner core 11, wherein the "uniformly" means that the silicon component or the composite of silicon and silicate in the interlayer is not a layer formed by stacking in the form of particles, but exists as a uniform and compact layer structure, see specifically the interlayer 12 of FIG. 2 and the interlayer 12 of FIG. 3. The interlayer of the negative electrode active material 1 of the present application may be composed only of elemental silicon, or may be composed of elemental silicon and lithium silicate. Compared with the prior art, the negative electrode active material of the present application has an interlayer composed of elemental silicon and lithium silicate or elemental silicon, providing sufficient room for the negative electrode active material to increase the overall silicon element content, thereby facilitating the improvement of the first reversible specific capacity and the first coulombic efficiency.

The outer shell layer 13 comprises amorphous carbon cladded on the outer surface of the interlayer 12, wherein the amorphous carbon is also referred to as transition state carbon, and belongs to a large class of carbon allotropes; the amorphous carbon refers to a carbon material with a very low degree of graphitization and crystallization and an approximately amorphous morphology (or having no fixed shape and periodic structural pattern), including but not limited to charcoal, coke, bone char, sugar charcoal, activated carbon and carbon black, etc.

The inventors of the present application have found that when the content of silicon element of the negative electrode active material of the present application increases to more than half based on the total mass of the negative electrode active material, the conductivity of the material is limited, which in turn is unfavorable to the conductivity of the electrode sheet, and the first reversible specific capacity and the first coulombic efficiency of the secondary battery are lost; therefore, the presence of the outer shell layer 13 of the present application improves the conductivity of the negative electrode active material; secondly, the outer shell layer 13 has a flexible buffering effect, which can relieve the volume expansion of the inner core 11 and the interlayer 12 during cycling, and improve the joint stability of the negative electrode active material 1; and moreover, the presence of the outer shell layer 13 can also effectively prevent excessive soaking of the silicon component in the inner core 11 by the electrolyte solution, and can effectively reduce the occurrence of side reactions.

Thus, in the present application, the inner core 11 is used as a nucleus, the interlayer 12 and the outer shell layer 13 are cladded outwards in sequence to form a uniformly cladded and structurally stable core-shell structure, so that not only the content of silicon element in the negative electrode active material can be significantly increased, but also the side reactions between the silicon components and the active lithium can be effectively suppressed, thereby simultaneously increasing the first reversible specific capacity and the first charge efficiency of the secondary battery.

In some embodiments, optionally the mass content of silicon element is 50%-70% based on the total mass of the negative electrode active material.

Optionally, the mass content of silicon element is 69%, 68%, 67%, 65%, 63%, 62%, 60%, 59%, 58%, 50%, or a value in a range obtained by combining any two of the above values.

In the prior art, the content of silicon element in the negative electrode active material 1 formed by mixing silicon and graphite is in the range of 40%-49%, and the limited silicon element content leads to a lower gram capacity of the negative electrode active material 1, and moreover, the first coulombic efficiency is low, so the first reversible specific capacity is at a lower level. However, the silicon element content of the negative electrode active material 1 of the present application is increased to be in the range of 50%-70%, the gram capacity of the negative electrode active material 1 is significantly increased, and the first reversible specific capacity is significantly improved.

In some embodiments, optionally the mass content of lithium element is 3%-10% based on the total mass of the negative electrode active material 1.

When the mass content of the lithium element is less than 3%, a sufficient amount of lithium silicate cannot be formed in the inner core 11 or the interlayer 12, so that in the negative electrode active material 1 with a higher silicon element content (for example, 50%-70%), the silicon component combines with the active lithium component in the electrolyte solution to consume the active lithium component in the electrolyte solution, thereby reducing the first reversible specific capacity and the first coulombic efficiency of the secondary battery; and when the mass content of the lithium element is higher than 10%, the content of the lithium element in the negative electrode active material 1 is too high, so that the lithium in the negative electrode active material 1 cannot be fully utilized, and there are side reactions between the excess lithium and certain substances in the electrolyte solution to generate gas, thereby reducing the first reversible specific capacity and the first coulombic efficiency of the secondary battery.

Optionally, the mass content of lithium element may be 3%, 5.7%, 7%, 7.5%, 8%, 8.2%, 8.3%, 8.5%, 10%, or a value in a range obtained by combining any two of the above values.

In some embodiments, optionally the mass content of carbon element is 2%-10% based on the total mass of the negative electrode active material 1.

When the mass percentage of the carbon element is less than 2%, on the one hand, the conductivity of the electrode sheet prepared from the negative electrode active material 1 is poor, and on the other hand, the structural stability and chemical stability of the negative electrode active material 1 are also greatly affected; and when the mass percentage of the carbon element is higher than 10%, the side reaction between lithium ions and the surface defective sites of the amorphous carbon is intensified, so that not only active lithium is consumed, but also the gas generation is intensified, thereby reducing the first reversible specific capacity and the first coulombic efficiency of the secondary battery.

Optionally, the mass content of carbon element may be 2%, 3.6%, 4.8%, 5%, 5.2%, 5.5%, 7%, 8%, 10%, or a value in a range obtained by combining any two of the above values.

In some embodiments, optionally the negative electrode active material 1 has a volume average particle size Dv50 of 3.5 μm-10 μm, the thickness of the interlayer 12 is 100 nm-400 nm, and the thickness of the outer shell layer 13 is 20 nm-150 nm.

When the dimensions of each part of the negative electrode active material 1 are within a reasonable range, on the one hand, the contents of the effective components in each part are within a reasonable range, so that they can be fully functional, and on the other hand, the transport path of lithium ions in the negative electrode active material 1 is not so long as to affect the first reversible specific capacity and the first coulombic efficiency of the secondary battery.

The thickness of the interlayer 12 is the distance between the outer surface of the interlayer 12 and the outer surface of the inner core 11; and the thickness of the outer shell layer 13 is the distance between the outer surface of the outer shell layer 13 and the outer surface of the interlayer 12.

By controlling the size of the volume average particle size Dv50 of the particles in the inner core 11, it is possible to avoid too large particle size or excessive fine powders of the negative electrode active material 1, and ensure the uniformity of the subsequent deposition; by controlling the thickness of the interlayer 12, it is possible to avoid the surface of the inner core 11 being exposed or the volume of the interlayer 12 expanding too much; by controlling the thickness of the outer shell layer 13, not only the conductivity of the negative electrode active material is improved, but also the expansion of the negative electrode active material 1 is relieved; and ultimately, the first reversible capacity and the first coulombic efficiency of the negative electrode active material 1 are improved.

The volume average particle size Dv50 refers to the particle size corresponding to the cumulative particle size distribution percentage of the sample reaching 50%, the physical meaning is that the particles with a particle size larger than it account for 50%, and particles with a particle size smaller than it also account for 50%; it can be obtained by testing with a laser diffraction particle size distribution measuring instrument (Mastersizer3000) according to GB/T19077-2016 test method.

In some embodiments, optionally in the negative electrode active material 1, the phase interface between the inner core 11 and the interlayer 12 has a recessed structure 111.

The presence of the recessed structure 111 at the phase interface on the one hand enables a more stable connection between the interlayer 12 and the surface of the inner core 11, thereby improving the structural stability of the negative electrode active material 1, and on the other hand allows for the deposition amount of the silicon component or lithium silicate to be increased, so that the silicon component or lithium silicate of the negative electrode active material 1 is at a higher level, thereby improving the first reversible specific capacity and the first coulombic efficiency of the secondary battery.

In some embodiments, optionally the oxide of silicon in the inner core 11 is SiOx, wherein $0.9<x<1.2$.

According to some embodiments of the present application and referring to FIG. 4, the present application provides a method for preparing a negative electrode active material 1, comprising the steps of:

S1: selecting an inner core precursor;

S2: subjecting the inner core precursor to an alkaline solution etching treatment, so that a recessed structure is formed on the surface of the inner core precursor;

S3: placing the inner core in a vapor deposition system, and introducing a first mixed gas to carry out a first reaction, so that the surface of the inner core is cladded with an interlayer to form a first intermediate;

S4: placing the first intermediate in a vapor deposition system, and introducing a second mixed gas to carry out a second reaction, so that an outer shell layer is formed on the interlayer to form a second intermediate;

S5: subjecting the second intermediate to a solid pre-lithiation reaction with a pre-lithiation agent to form a pre-lithiated body;

S6: washing the pre-lithiated body in a solvent, filtering, oven drying and sieving to form the negative electrode active material; wherein, the negative electrode active material comprises:

the inner core comprising silicon, an oxide of silicon, and/or lithium silicate;

the interlayer comprising silicon, or comprising silicon and lithium silicate;

the outer shell layer comprising amorphous carbon;

wherein the interlayer is cladded on the surface of the inner core, and the outer shell layer is cladded on the surface of the interlayer.

In some embodiments, optionally in step S1, the choosing principle for the inner core precursor particles is: the volume average particle size Dv50 is 3-7 μm, and $1 \le (Dv90-Dv10)/Dv50 \le 1.4$.

Choosing in accordance with the above principle enables the particle size of the inner core precursor particles to be within a reasonable range, thereby facilitating the full utilization of the electrical performance of the negative electrode active material 1 prepared therefrom. When the volume average particle size Dv50 is too small and is not within the range of $1 \le (Dv90-Dv10)/Dv50 \le 1.4$, the uniformity of the subsequent deposition and cladding will be affected. When the volume average particle size Dv50 is too large and is not within the range of $1 \le (Dv90-Dv10)/Dv50 \le 1.4$, the kinetics of the prepared negative electrode active material 1 becomes worse, lithium ion deintercalation is more difficult, the capacity utilization is affected, and the first coulombic efficiency also decreases; If the particle size distribution is not in this range, higher than 1.4 corresponds to a wider relative particle size distribution, a poor particle uniformity, and a worsened deposition and carbon cladding effect; and lower than 1 corresponds to a greater process difficulty and a low material recovery.

In some embodiments, optionally in step S2, the solid-liquid mass ratio of the inner core precursor to the alkaline solution is 0.5-1.5:2.5-3.5. Optionally, the concentration of the alkaline solution can be 0.5 mol/L-3 mol/L, and the time of the alkaline solution etching treatment is 10 min-120 min.

The alkaline solution etching treatment means that the inner core precursor is placed in the alkaline solution, and the alkaline solution erodes the outer surface of the inner core precursor, thereby forming several recessed structures on the outer surface of the inner core precursor, and the presence of these recessed structures can increase the deposition area of the interlayer component, and increase the connection strength between the interlayer component and the inner core; and secondly, the presence of the recessed structures further helps to increase the content of silicon element in the negative electrode active material. Here, the alkaline solution includes but is not limited to one or more of sodium hydroxide, potassium hydroxide and lithium hydroxide solution. The concentration of the alkaline solution is 0.5 mol/L-3 mol/L, and the time of the alkaline solution etching treatment is 10 min-120 min.

In some embodiments, optionally in the first reaction of step S3, the temperature of the first reaction is 500° C.-800° C.; the first mixed gas comprises a first reaction gas and a first carrier gas, wherein the mass percentage of the first reaction gas is 5%-50%, and the mass percentage of the first carrier gas is 50%-95%. Optionally, the first gas phase reaction can be carried out in a vapor deposition system.

Further, the first reaction gas may be one or more of silane, silicon halide and other silane derivatives, and the first carrier gas is one or more of argon, nitrogen and helium.

In some embodiments, optionally in the second reaction of step S4, the temperature of the second reaction is 500° C.-800° C.; the second mixed gas comprises a second reaction gas and a second carrier gas, wherein the mass percentage of the second reaction gas is 5%-50%, and the mass percentage of the second carrier gas is 50%-95%. Optionally, the second gas phase reaction can be carried out in a vapor deposition system.

Further, the second reaction gas may be one or more of methane, ethane, ethylene and acetylene, and the second carrier gas may be one or more of argon, nitrogen and helium.

In some embodiments, optionally in the solid pre-lithiation reaction of step S5, the pre-lithiation agent is added in an amount of 5%-20% of the total mass of the second intermediate and the pre-lithiation agent; the reaction temperature of the solid pre-lithiation reaction is 500° C.-900° C., and the reaction time is 0.5-4 h.

The pre-lithiation agent refers to a lithium source provided for the pre-lithiation reaction, in other words, the pre-lithiation agent is an external source of lithium in the negative electrode active material 1. The pre-lithiation agent may be one or more of lithium metal, an oxygen-containing lithium salt and a non-oxygen-containing lithium salt, and optionally lithium metal, lithium amide, lithium titanate, lithium oxide and lithium acetate.

By blending a suitable amount of a pre-lithiation agent in the negative electrode active material 1 of the present application, the lithium element and silicon element can pre-form lithium silicate component during the synthesis of the negative electrode active material 1, thereby preventing the loss of active lithium in the electrolyte solution caused by the side reaction between the silicon component in the negative electrode active material 1 and the active lithium in the electrolyte solution, and thereby improving the first coulombic efficiency of the secondary battery.

In some embodiments, optionally in step S6, the mass ratio of the pre-lithiated body to the solvent may be 0.25-0.6:1, the solvent may be water or ethanol, and the washing time may be 5 min-120 min.

According to the preparation method of the present application, a negative electrode active material 1 is synthesized with a unique double cladding layer structure, an inner core containing lithium silicate, and a significantly increased silicon element content, which can significantly improve the gram capacity utilization, the first coulombic efficiency and the first reversible specific capacity of the negative electrode active material, thereby improving the energy density of the battery.

The present application provides a negative electrode sheet, comprising a negative electrode current collector and a negative electrode film layer provided on at least one surface of the negative electrode current collector, wherein the negative electrode film layer comprises a negative electrode active material 1, which can be the negative electrode active material 1 of the first aspect of the present application.

As an example, the negative electrode current collector has two opposite surfaces in its own thickness direction, and the negative electrode film layer is provided on either one or both of the two opposite surfaces of the negative electrode current collector.

In some embodiments, the negative electrode current collector can be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), polyethylene (PE), and the like).

In some embodiments, the negative electrode active material may be a negative electrode active material for batteries well known in the art. As an example, the negative electrode active material may include at least one of artificial graphite, natural graphite, soft carbon, hard carbon, a silicon-based material, a tin-based material, lithium titanate, and the like. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and other conventional materials useful as negative electrode active materials for batteries can also be used. The above-mentioned negative electrode active materials may be used alone or in combination of two or more thereof.

In some embodiments, the negative electrode film layer further optionally comprises a binder. The binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally comprises a conductive agent. The conductive agent may be selected from at least one of superconducting carbon, acetylene black, carbon black, Ketjen black, carbon dot, carbon nanotube, graphene, and carbon nanofiber.

In some embodiments, the negative electrode film layer further optionally comprises other auxiliaries, for example, a thickener (e.g., sodium carboxymethyl cellulose (CMC-Na)) and the like.

In some embodiments, the negative electrode sheet can be prepared by: dispersing the components for preparing the negative electrode sheet, for example, the negative electrode active material, the conductive agent, the binder and any other components in a solvent (for example, deionized water) to form a negative electrode slurry; and coating the negative electrode slurry on a negative electrode current collector, followed by oven drying, cold pressing and other procedures, to obtain the negative electrode sheet.

[Positive Electrode Sheet]

The positive electrode sheet comprises a positive electrode current collector and a positive electrode film layer provided on at least one surface of the positive electrode current collector, wherein the positive electrode film layer comprises a positive electrode active material.

As an example, the positive electrode current collector has two opposite surfaces in its own thickness direction, and the positive electrode film layer is provided on either one or both of the two opposite surfaces of the positive electrode current collector.

In some embodiments, the positive electrode current collector can be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), polyethylene (PE), and the like).

In some embodiments, the positive electrode active material may be a positive electrode active material for batteries well known in the art. As an example, the positive electrode active material may include at least one of the following materials: a lithium-containing phosphate of olivine structure, a lithium transition metal oxide, and a respective modified compound thereof. However, the present application is not limited to these materials, and other conventional materials useful as positive electrode active materials for batteries can also be used. These positive electrode active materials may be used alone or in combination of two or more thereof. Among them, examples of lithium transition metal oxides may include but are not limited to, at least one of a lithium-cobalt oxide (such as $LiCoO_2$), a lithium-nickel oxide (such as $LiNiO_2$), a lithium-manganese oxide (such as $LiMnO_2$ and $LiMn_2O_4$), a lithium-nickel-cobalt oxide, a lithium-manganese-cobalt oxide, a lithium-nickel-manganese oxide, a lithium-nickel-cobalt-manganese oxide (such as $LiNi_{1/3}Co_{1/3}Mn_{1/3}O_2$(also referred to as $NCM_{333}$), $LiNi_{0.5}Co_{0.2}Mn_{0.3}O_2$(may also be abbreviated as $NCM_{523}$), $LiNi_{0.5}Co_{0.25}Mn_{0.25}O_2$(may also be abbreviated as $NCM_{211}$), $LiNi_{0.6}Co_{0.2}Mn_{0.2}O_2$(may also be abbreviated as $NCM_{622}$), $LiNi_{0.8}Co_{0.1}Mn_{0.1}O_2$ (also referred to as $NCM_{811}$for short)), a lithium-nickel-cobalt-aluminum oxide (such as $LiNi_{0.85}Co_{0.15}Al_{0.05}O_2$) and a modified compound thereof. Examples of the lithium-containing phosphate of olivine structure may include, but are not limited to, at least one of lithium iron phosphate (such as $LiFePO_4$(also referred to as LFP)), a composite material of lithium iron phosphate and carbon, lithium manganese phosphate (such as $LiMnPO_4$), a composite material of lithium manganese phosphate and carbon, lithium iron manganese phosphate, and a composite material of lithium manganese iron phosphate and carbon.

In some embodiments, the positive electrode film layer further optionally comprises a binder. As an example, the binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer and a fluorine-containing acrylate resin.

In some embodiments, the positive electrode film layer further optionally comprises a conductive agent. As an example, the conductive agent may include at least one of superconducting carbon, acetylene black, carbon black, Ketjen black, carbon dot, carbon nanotube, graphene, and carbon nanofiber.

In some embodiments, the positive electrode sheet can be prepared by: dispersing the components for preparing the positive electrode sheet, for example, the positive electrode active material, the conductive agent, the binder and any other components in a solvent (for example, N-methyl pyrrolidone) to form a positive electrode slurry; and coating the positive electrode slurry on a positive electrode current collector, followed by oven drying, cold pressing and other procedures, to obtain the positive electrode sheet.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid state, a gel state, or an all-solid state.

In some embodiments, an electrolyte solution is used as the electrolyte. The electrolyte solution comprises an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro (oxalato)borate, lithium bis(oxalate)borate, lithium difluoro bis(oxalato)phosphate, and lithium tetrafluoro(oxalato) phosphate.

In some embodiments, the solvent may be selected from at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate ethyl propionate, propyl propionate, methyl butyrate, ethyl butyrate, 1,4-butyrolactone, sulfolane, dimethyl sulfone, methyl ethyl sulfone and diethyl sulfone.

In some embodiments, the electrolyte solution further optionally comprises an additive. For example, the additive may include a negative electrode film-forming additive, a positive electrode film-forming additive, and also an additive capable of improving certain properties of the battery, such as an additive for improving the overcharge performance of the battery, and an additive for improving the high-temperature or low-temperature performance of the battery, etc.

[Separator]

In some embodiments, a separator is further included in the secondary battery 2. The type of the separator is not particularly limited in the present application, and any well-known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, and there is no particular limitation.

[Secondary Battery]

Additionally, the secondary battery 2, the battery module 3, the battery pack 4, and the electrical apparatus 5 of the present application will be described below with reference to the accompanying drawings as appropriate.

According to some embodiments of the present application, reference is made to FIG. 5-FIG. 6, wherein FIG. 5 is a schematic structural view of a secondary battery 2 according to some embodiments of the present application, and FIG. 6 is a exploded structural view of a secondary battery 2 according to some embodiments of the present application. The present application provides a secondary battery 2.

Generally, the secondary battery 2 includes a positive electrode sheet, a negative electrode sheet, an electrolyte, and a separator. During charging and discharging of the battery, active ions are intercalated and deintercalated back and forth between the positive electrode sheet and the negative electrode sheet. The electrolyte serves to conduct ions between the positive electrode sheet and the negative electrode sheet. The separator is provided between the positive electrode sheet and the negative electrode sheet, and mainly functions to prevent a short circuit between the positive electrode and the negative electrode while allowing ions to pass through.

In some embodiments, the positive electrode sheet, the negative electrode sheet, and the separator can be made into an electrode assembly 22 by a winding process or a lamination process.

In some embodiments, the secondary battery 2 may include an outer package. The outer package can be used to encapsulate the above-mentioned electrode assembly 22 and the electrolyte.

In some embodiments, the outer package of the secondary battery 2 may be a hard case, such as a hard plastic case, an aluminum case, a steel case, and the like. The outer package of the secondary battery 2 can also be a soft pack, such as a bag-type soft pack. The material of the soft pack can be a plastic, and examples of the plastic include polypropylene, polybutylene terephthalate and polybutylene succinate, etc.

The shape of the secondary battery 2 is not particularly limited in the present application, and it may be cylindrical, square, or any other shape. For example, FIG. 5 shows a secondary battery 2 with a square structure as an example.

In some embodiments, reference is again made to FIG. 6, which is an exploded structural view of a secondary battery 2 according to some embodiments of the present application. The outer package may include a case 21 and a cover plate. Here, the case 21 can include a bottom plate and a side plate connected to the bottom plate, with the bottom plate and the side plate enclosing to form an accommodating cavity. The case 21 has an opening in communication with the accommodating cavity, and the cover plate can cover the opening to close the accommodating cavity. The positive electrode sheet, the negative electrode sheet, and the separator may be formed into an electrode assembly 22 by a winding process or a lamination process. The electrode assembly 22 is encapsulated within the accommodating cavity. The electrolyte solution infiltrates the electrode assembly 22. The number of electrode assemblies 22 comprised in the secondary battery 2 may be one or more, which can be selected by those skilled in the art according to specific actual requirements.

According to some embodiments of the present application and referring to FIG. 7, which is a schematic structural view of a battery module 3 according to some embodiments of the present application. The present application provides a battery module 3. The battery module 3 includes the secondary battery 2 provided by the present application. The number of secondary batteries 2 comprised in the battery module 3 may be one or more, and the specific number can be selected by those skilled in the art according to the application and capacity of the battery module 3.

In the battery module 3, a plurality of secondary batteries 2 can be sequentially arranged along the length direction of the battery module 3. Of course, any other arrangements are also possible. The plurality of secondary batteries 2 may further be fixed by fasteners.

Optionally, the battery module 3 can further include a case having an accommodating space, in which the plurality of secondary batteries 2 are accommodated.

According to some embodiments of the present application, reference is made to FIG. 8-FIG. 9, wherein FIG. 8 is a schematic structural view of a battery pack 4 according to some embodiments of the present application, and FIG. 9 is a exploded structural view of a battery pack 4 according to some embodiments of the present application. The present application provides a battery pack 4. The battery pack 4 includes the battery module 3 provided by the present application. The number of battery modules 3 comprised in the battery pack 4 may be one or more, and the specific number can be selected by those skilled in the art according to the application and capacity of the battery pack 4.

The battery pack 4 can include a battery box and a plurality of battery modules 3 provided in the battery box. The battery box includes an upper box 41 and a lower box 42, wherein the upper box 41 can cover the lower box 42, and forms an enclosed space for accommodating the battery modules 3. The plurality of battery modules 3 may be arranged in the battery box in any manner.

In addition, according to some embodiments of the present application, the present application further provides an electrical apparatus 5. The electrical apparatus 5 comprises at least one of the secondary batteries 2, the battery module 3 and the battery pack 4 provided by the present application. The secondary battery 2, the battery module 3, and the battery pack 4 can be used as a power source for the electrical apparatus 5, and can also be used as an energy storage unit for the electrical apparatus 5. The electrical apparatus 5 may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electrical apparatus 5, the secondary battery 2, battery module 3, or battery pack 4 can be selected according to its use requirements.

Referring to FIG. 10, which is a schematic structural view of an electrical apparatus 5 according to some embodiments of the present application. The electrical apparatus 5 is an all-electric vehicle, a hybrid electric vehicle, a plug-in hybrid electric vehicle, or the like. In order to meet the requirements of the electrical apparatus 5 for high power and high energy density of secondary batteries 2, a battery pack 4 or a battery module 3 may be used.

In some embodiments, the electrical apparatus 5 may be a mobile phone, a tablet, a laptop, etc. The electrical apparatus 5 is generally required to be light and thin, and can use a secondary battery 2 as a power source.

EXAMPLES

Hereinafter, examples of the present application will be described. The examples described below are exemplary and only used to explain the present application, and are not to be construed as limiting the present application. Where specific techniques or conditions are not specified in the examples, the techniques or conditions described in the literatures of the art or the product specifications are followed. Where manufacturers are not specified, the reagents or instruments used are conventional products and are commercially available.

Example 1-1

Preparation of negative electrode active material

S1: selecting an oxide of silicon SiOx with a Dv50 of 5 μm and a (Dv90−Dv10)/Dv50 of 1.1 as a inner core precursor particle;

S2: preparing a 1 mol/L potassium hydroxide solution, adding the inner core precursor particle to the alkaline solution in a solid-liquid mass ratio of 1:3, and stirring to treat for 30 min;

S3: placing 100 g of the above treated inner core precursor particles in a vapor deposition system, introducing nitrogen protective gas and $SiH_4$ reaction gas, wherein the flow of the reaction gas accounts for 30%, heating up to 500° C. and maintaining the temperature for 4 h to obtain a first intermediate;

S4: placing the above-mentioned first intermediate in a vapor deposition system, introducing a mixed gas of acetylene and nitrogen, wherein the flow of acetylene accounts for 20%, heating up to 700° C. and maintaining the temperature for 2 h to obtain a second intermediate;

S5: mixing the above-mentioned second intermediate with lithium amide as a pre-lithiation agent, wherein the pre-lithiation agent is added in an amount of 10% of the total mass of the second intermediate and the pre-lithiation agent; heat treating under the protection of nitrogen, heating up to 700° C. and maintaining the temperature for 2 h to obtain a pre-lithiated body;

S6: dispersing the above-mentioned pre-lithiated body into water, wherein the mixing mass ratio of the pre-lithiated body to water is 3:7; continuously stirring and washing for 10 min, then filtering, oven drying and sieving to obtain the negative electrode active material of Example 1-1.

Preparation of Negative Electrode Sheet

Mixing the negative electrode active material obtained in Example 1-1, conductive carbon black, and polyacrylic acid as a binder in a mass ratio of 80:10:10, then adding deionized water, and stirring with a vacuum stirrer until uniform to obtain a negative electrode slurry. Uniformly coating the negative electrode slurry on a copper foil as the negative electrode current collector, oven drying at 85° C. and cold pressing to obtain the negative electrode sheet of Example 1-1, which was then punched into a 14 mm disc with a punching machine and used as the negative electrode sheet for a button-type secondary battery.

Preparation of Positive Electrode Sheet

Using a metal lithium sheet with a diameter of 18 mm as a counter electrode for preparing the button-type secondary battery, and then removing the oxide film on the surface thereof to be used as the positive electrode sheet of the button-type secondary battery.

Preparation of Electrolyte Solution

Formulating ethylene carbonate, ethyl methyl carbonate and diethyl carbonate in a volume ratio of 20:20:60 into a mixed solution, and dissolving a sufficiently dried lithium salt in the above mixed solution, then adding 10 wt % of fluoroethylene carbonate as an additive and mixing uniformly to obtain the electrolyte solution. Here, the concentration of the lithium salt was 1 mol/L. The entire operation was carried out in an argon atmosphere glove box with a water content of <10 ppm.

Preparation of Separator

Using a polyethylene film (Celgard 2400) with a thickness of 12 μm as the separator, which was punched to a suitable size and used as the separator for the button-type secondary battery.

Preparation of Button-Type Secondary Battery

Placing a foamed nickel with a diameter of 20 mm into a bottom case, then placing the above-mentioned positive electrode sheet, adding 60 mg of the electrolyte solution, placing the separator, placing the above-mentioned negative electrode sheet, continuing to add 60 mg of the electrolyte solution, covering with an upper top cover and sealing, wherein the assembled battery had an open circuit voltage of ≥2.5V, and the button-type secondary battery of Example 1-1 was obtained.

Example 1-2

Compared with Example 1-1, the lithium salt used in step S5 was adjusted to lithium hydroxide, and the other steps were the same as in Example 1-1.

Example 2-1

Compared with Example 1-1, the time for maintaining the temperature in Step S3 was adjusted to 3 h, or the flow of the reaction gas was reduced to account for 25%, and the other steps were the same as in Example 1-1.

Example 2-2

Compared with Example 1-1, the time for maintaining the temperature in Step S3 was adjusted to 2 h, or the flow of the reaction gas was reduced to account for 15%, and the other steps were the same as in Example 1-1.

Example 2-3

Compared with Example 1-1, the time for maintaining the temperature in Step S3 was adjusted to 6 h, or the flow of the reaction gas was increased to account for 60%, and the other steps were the same as in Example 1-1.

Example 2-4

Compared with Example 1-1, the time for maintaining the temperature in Step S3 was adjusted to 0.5 h, or the flow of the reaction gas was reduced to account for 1%, and the other steps were the same as in Example 1-1.

Example 3-1

Compared with Example 1-1, the temperature used in step S5 was increased to 800° C. or the amount of the pre-lithiation agent used was increased to 15%, and the other steps were the same as in Example 1-1.

Example 3-2

Compared with Example 1-1, the temperature used in step S5 was reduced to 550° C. or the amount of the pre-lithiation agent used was reduced to 5%, and the other steps were the same as in Example 1-1.

Example 3-3

Compared with Example 1-1, the time for maintaining the temperature in Step S4 was adjusted to 4 h, or the flow of the reaction gas was increased to account for 40%, and the other steps were the same as in Example 1-1.

Example 3-4

Compared with Example 1-1, the time for maintaining the temperature in Step S4 was adjusted to 1 h, or the flow of the reaction gas was reduced to account for 10%, and the other steps were the same as in Example 1-1.

Example 3-5

Compared with Example 1-1, the temperature used in step S5 was increased to 900° C. or the amount of the pre-lithiation agent used was increased to 30%, and the other steps were the same as in Example 1-1.

Example 3-6

Compared with Example 1-1, the temperature used in step S5 was reduced to 450° C. or the amount of the pre-lithiation agent used was reduced to 1%, and the other steps were the same as in Example 1-1.

Example 3-7

Compared with Example 1-1, the time for maintaining the temperature in Step S4 was adjusted to 6 h, or the flow of the reaction gas was increased to account for 50%, and the other steps were the same as in Example 1-1.

Example 3-8

Compared with Example 1-1, the time for maintaining the temperature in Step S4 was adjusted to 0.5 h, or the flow of the reaction gas was reduced to account for 10%, and the other steps were the same as in Example 1-1.

Comparative Example 1-1

Compared with Example 1-1, step S5 is absent, and the other steps were the same as in Example 1-1.

Comparative Example 1-2

Compared with Example 1-1, step S3 is absent, and the other steps were the same as in Example 1-1.

Comparative Example 1-3

Compared with Example 1-1, step S4 is absent, and the other steps were the same as in Example 1-1.

Comparative Example 1-4

Only the inner core precursor particle in step S1 of Example 1-1 was used as the negative electrode active material, and the other steps were the same as in Example 1-1.

[Parameter Test of Negative Electrode Active Material]

1. Tests for Internal Layer Structure and Thickness of Negative Electrode Active Material The negative electrode sheets corresponding to all the Examples and Comparative Examples were cut to a size of 6 mm×6 mm, and subjected to polishing treatment using an ion polisher from Leica, germany, at 7.5 KV for 90 min, and then a scanning electron microscope equipment (Zeiss Sigma300) was used to acquire the internal layer structure of the negative electrode active material and the thickness of each layer according to JY/T010-1996 standard.

2. Test for Contents of Silicon Element and Lithium Element in Negative Electrode Active Material All Examples and Comparative Examples were tested for the above elements using an inductively coupled plasma emission spectrometer (ICP, iCAP 7400 equipment) according to the standard EPA 6010D-2014.

3. Test for Content of Carbon Element in Negative Electrode Active Material

According to GB/T 20123-2006/ISO 15350:2000 test standard, an HSC-140 carbon element content analyzer was used for testing.

4. Particle Size Distribution Test

The particle size of the inner core particles and the particle size of the negative electrode active material particles were measured according to GB/T19077-2016 test method, a laser diffraction particle size distribution measuring instrument (Mastersizer3000) was used to obtain a particle size distribution curve, and the particle size parameters such as Dv50, D10, D90, and the like could be acquired.

[Performance Test of Secondary Battery]

2. Test for First Reversible Specific Capacity and First Coulombic Efficiency

The assembled button-type secondary battery was clamped to the test clamp of LAND CT2001A and allowed to stand for 60 min, and the charge/discharge curve of the corresponding material was obtained according to the process of: constant current discharging at 0.05 C to 5 mV, discharging at 50 μA to 5 mV; and charging at 0.1 C to 0.8 V (the nominal capacity in the process was set as C=1200 mAh). Here, the discharge process yielded the lithium intercalation capacity CQ, the charge process yielded the first reversible specific capacity CT, and the first coulombic efficiency ICE=CT/CQ (%).

The relevant parameters of the negative electrode active material and the performance test data of the secondary battery of Examples and Comparative Examples are shown in Table 1.

TABLE 1

Relevant parameters of negative electrode active material and performance test data of secondary battery of Examples and Comparative Examples

| examples | Negative electrode active material: Inner core Component | Interlayer Component | Interlayer Thickness/nm | Outer shell layer Component | Outer shell layer Carbon element content | Outer shell layer Thickness/nm | Silicon element content | Lithium element content | Dv 50 μm | Battery performance: First reversible specific capacity mAh/g | First coulombic efficiency % |
|---|---|---|---|---|---|---|---|---|---|---|---|
| Example 1-1 | Silicon + oxide of silicon + lithium silicate | Silicon | 400 | Amorphous carbon | 5% | 80 | 65% | 8% | 5.5 | 1625 | 86.5 |
| Example 1-2 | Silicon + oxide of silicon + lithium silicate | Silicon + lithium silicate | 400 | Amorphous carbon | 5% | 80 | 65% | 8% | 5.5 | 1605 | 86.1 |
| Comparative Example 1 | Silicon + oxide of silicon | Silicon | 400 | Amorphous carbon | 5.5% | 80 | 70% | 0 | 5.5 | 1610 | 69.5 |
| Comparative Example 2 | Silicon + oxide of silicon | / | / | Amorphous carbon | 8% | 80 | 42% | 12% | 5.2 | 1229 | 79.8 |
| Comparative Example 3 | Silicon + oxide of silicon | Silicon | 400 | / | 0 | / | 68% | 8.5% | 5.4 | 1480 | 80.5 |
| Comparative Example 4 | Silicon + oxide of silicon | / | / | / | 0 | / | 48% | 0 | 5 | 1123 | 67.6 |

TABLE 2

Relevant parameters of negative electrode active material and performance test data of secondary battery of Examples and Comparative Examples

| examples | Negative electrode active material: Inner core Component | Interlayer Component | Interlayer Thickness/nm | Outer shell layer Component | Outer shell layer Carbon element content | Outer shell layer Thickness/nm | Silicon element content | Lithium element content | Dv 50 μm | Battery performance: First reversible specific capacity mAh/g | First coulombic efficiency % |
|---|---|---|---|---|---|---|---|---|---|---|---|
| Example 1-1 | Silicon + oxide of silicon + lithium silicate | Silicon | 400 | Amorphous carbon | 5% | 80 | 65% | 8% | 5.5 | 1625 | 86.5% |
| Example 2-1 | Silicon + oxide of silicon + lithium silicate | Silicon | 290 | Amorphous carbon | 5.5% | 90 | 59% | 8.5% | 5.4 | 1509 | 86.1% |
| Example 2-2 | Silicon + oxide of silicon + lithium silicate | Silicon | 100 | Amorphous carbon | 7% | 100 | 50% | 10% | 5.2 | 1298 | 85.8% |
| Example 2-3 | Silicon + oxide of silicon | Silicon | 600 | Amorphous carbon | 3.6% | 30 | 75% | 5.7% | 5.7 | 1789 | 79.4% |

TABLE 2-continued

Relevant parameters of negative electrode active material and performance test data of secondary battery of Examples and Comparative Examples

| examples | Negative electrode active material: Inner core Component | Interlayer Component | Interlayer Thickness/nm | Outer shell layer Component | Carbon element content | Thickness/nm | Silicon element content | Lithium element content | Dv 50 μm | Battery performance: First reversible specific capacity mAh/g | First coulombic efficiency % |
|---|---|---|---|---|---|---|---|---|---|---|---|
| Example 2-4 | Silicon + oxide of silicon + lithium silicate | Silicon | 60 | Amorphous carbon | 8% | 100 | 45% | 12.5% | 5.2 | 1190 | 82.1% |

TABLE 3

Relevant parameters of negative electrode active material and performance test data of secondary battery of Examples and Comparative Examples

| examples | Negative electrode active material: Inner core Component | Interlayer Component | Interlayer Thickness/nm | Outer shell layer Component | Carbon element content | Thickness/nm | Silicon element content | Lithium element content | Dv 50 μm | Battery performance: First reversible specific capacity mAh/g | First coulombic efficiency % |
|---|---|---|---|---|---|---|---|---|---|---|---|
| Example 1-1 | Silicon + oxide of silicon + lithium silicate | Silicon | 400 | Amorphous carbon | 5% | 80 | 65% | 8% | 5.5 | 1625 | 86.5% |
| Example 3-1 | Silicon + oxide of silicon + lithium silicate | Silicon | 400 | Amorphous carbon | 4.8% | 80 | 63% | 10% | 5.5 | 1599 | 87.6% |
| Example 3-2 | Silicon + oxide of silicon + lithium silicate | Silicon | 400 | Amorphous carbon | 5.2% | 80 | 68% | 3% | 5.6 | 1621 | 83.3% |
| Example 3-3 | Silicon + oxide of silicon + lithium | Silicon | 400 | Amorphous carbon | 10% | 150 | 62% | 7.5% | 5.6 | 1611 | 84.5% |
| Example 3-4 | Silicon + oxide of silicon + lithium | Silicon | 400 | Amorphous carbon | 2% | 30 | 67% | 8.2% | 5.4 | 1587 | 84.2% |
| Comparative Example 3-1 | Silicon + oxide of silicon + lithium | Silicon | 400 | Amorphous carbon | 4.6% | 80 | 60% | 15% | 5.5 | 1279 | 83.5% |
| Comparative Example 3-2 | Silicon + oxide of silicon + lithium | Silicon | 400 | Amorphous carbon | 5.4% | 80 | 69% | 1% | 5.5 | 1631 | 79.7% |
| Comparative Example 3-3 | Silicon + oxide of silicon + lithium | Silicon | 400 | Amorphous carbon | 15% | 180 | 58% | 7% | 5.5 | 1312 | 80.5% |
| Comparative Example 3-4 | Silicon + oxide of silicon + lithium | Silicon | 400 | Amorphous carbon | 1% | 15 | 68% | 8.3% | 5.5 | 1299 | 80.1% |

[Data Analysis]

As can be seen from Table 1, both the first reversible specific capacities and the first coulombic efficiencies of the secondary batteries corresponding to the negative electrode active materials of the Examples are significantly improved in comparison with the Comparative Examples. By comparing Comparative Example 1 with Example 1-1, it can be seen that due to the absence of lithium silicate component in the inner core of the negative electrode active material of Comparative Example 1, the decrease of the first reversible specific capacity of the corresponding secondary battery is not significant, but the first coulombic efficiency of the corresponding secondary battery decreases significantly; by comparing Comparative Example 2 with Example 1-1, it can be seen that the negative electrode active material of Comparative Example 2 lacks not only lithium silicate component but also an interlayer, and thus both the first reversible specific capacity and the first coulombic efficiency of the corresponding secondary battery decrease significantly; by comparing Comparative Example 3 with Example 1-1, it can be seen that the negative electrode active material of Comparative Example 3 lacks an outer shell layer, so the structural stability, chemical stability and conductivity of the corresponding negative electrode active material are poor, and both the first reversible specific capacity and the first coulombic efficiency of the corresponding secondary battery are reduced, but are higher than those of Comparative Example 1; and by comparing Comparative Example 4 with the other Examples and Comparative Examples, it can be seen that the first reversible specific capacity and the first coulombic efficiency of the secondary battery corresponding to the negative electrode active material of Comparative Example 4 are the worst.

As can be seen from Table 2, the negative electrode active materials having the silicon element content ranges of Example 1-1, Example 2-1 to Example 2-3 have both excellent first reversible capacity and first coulombic efficiency; while Examples 2-3 which correspond to higher silicon element contents have improved first reversible capacities, the first coulombic efficiencies decrease significantly; and while Examples 2-4 which correspond to lower silicon element contents have improved first coulombic efficiencies, the first reversible capacities decrease significantly.

As can be seen from Table 3, in comparison with Example 1-1 and Example 3-1 to Example 3-4, when the carbon element content is too high (Comparative Example 3-3) or too low (Comparative Example 3-4), it is unfavorable to balance the first reversible specific capacity and the first coulombic efficiency; and in comparison with Example 1-1 and Example 3-1 to Example 3-4, when the carbon element content is too high (Comparative Example 3-1) or too low (Comparative Example 3-2), it is unfavorable to balance the first reversible specific capacity and the first coulombic efficiency.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A negative electrode active material, characterized by comprising:

an inner core comprising silicon, an oxide of silicon, and lithium silicate;

an interlayer comprising silicon, or comprising silicon and lithium silicate;

an outer shell layer comprising amorphous carbon;

wherein the interlayer is cladded on a surface of the inner core, and the outer shell layer is cladded on the surface of the interlayer;

based on a total mass of the negative electrode active material, a mass content of silicon element is 50%-70%, a mass content of lithium element is 3%-10%, and a mass content of carbon element is 2%-10%, a volume average particle size Dv50 of the negative electrode active material is 3.5 μm-10 μm, a thickness of the interlayer is 100 nm-400 nm, and a thickness of the outer shell layer is 20 nm-150 nm.

2. The negative electrode active material according to claim 1, characterized in that a phase interface between the inner core and the interlayer has a recessed structure.

3. The negative electrode active material according to claim 1, characterized in that the oxide of silicon is SiOx, wherein $0.9<x<1.2$.

4. A secondary battery, characterized by comprising the negative electrode active material of claim 1.

5. A battery module, characterized by comprising the secondary battery of claim 4.

6. A battery pack, characterized by comprising the battery module of claim 5.

7. An electrical apparatus, characterized by comprising at least one of the secondary battery of claim 4, the battery module of claim 5, and the battery pack of claim 6.

* * * * *